Feb. 1, 1955   F. P. GRANGER, JR   2,701,333
VOLTAGE REGULATED INVERTER
Filed Jan. 10, 1952
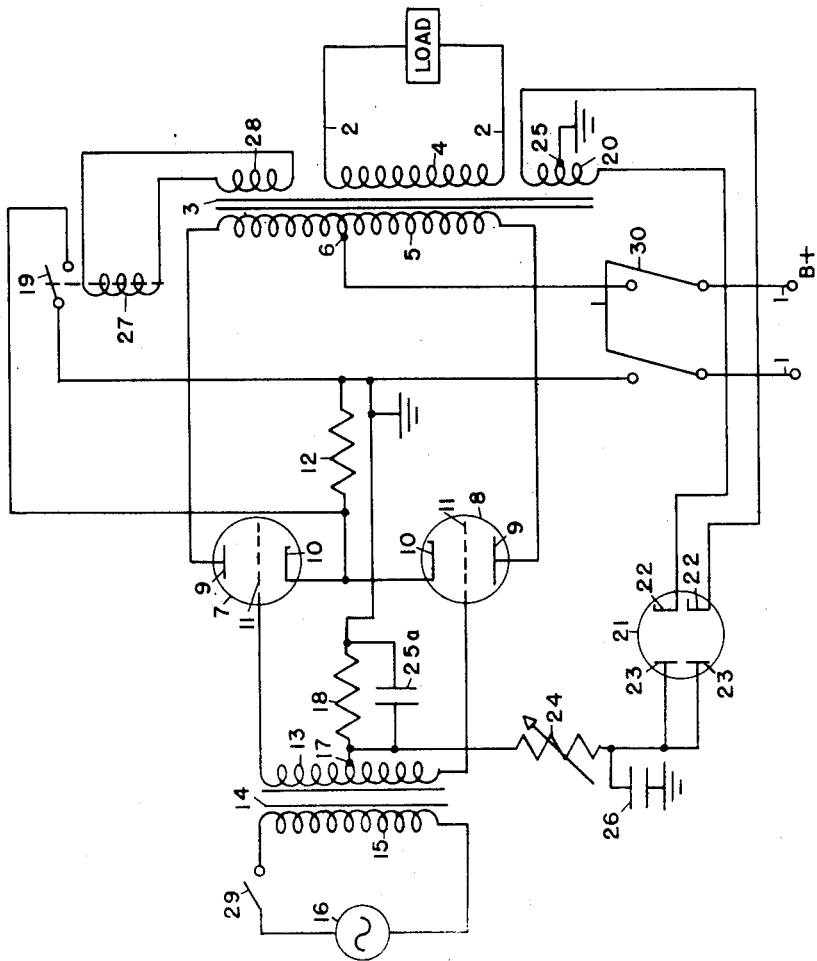
INVENTOR.
FRED P. GRANGER, JR.
BY *Walter J Jagner*
ATTORNEY United States Patent Office 2,701,333
Patented Feb. 1, 1955

2,701,333

VOLTAGE REGULATED INVERTER

Fred P. Granger, Jr., Garland, Tex.

Application January 10, 1952, Serial No. 265,793

5 Claims. (Cl. 321—12)

My invention relates to electric translating apparatus and more particularly to such apparatus for transmitting energy from a direct current supply circuit to an alternating current load circuit.

In many applications it is necessary to energize a substantially constant voltage alternating current load circuit connected to a variable load from a direct current supply circuit whose voltage is subject to variation. The electric translating apparatus connected between the supply and load circuits must therefore be provided with a voltage regulating means which will maintain the voltage of the alternating current load circuit constant regardless of the variations in the load and in the voltage of the direct current supply circuit.

Accordingly, it is an object of my invention to provide a new and improved electric translating apparatus.

It is another object of my invention to provide a new and improved electric translating apparatus for energizing a constant voltage alternating current load circuit from a direct current supply circuit.

It is still another object of my invention to provide a new and improved electric translating apparatus having a pair of electric discharge devices of the high vacuum type for transmitting energy from a direct current supply circuit to an alternating current load circuit.

In accordance with an embodiment of my invention, an excitation circuit for a pair of grid controlled electric discharge devices of the high vacuum type is energized from a source of alternating potential to render the electric discharge devices alternatively conductive. The electric discharge devices transmit energy from a direct current supply circuit to an alternating current load circuit. A variable negative bias potential which varies in accordance with the voltage of the load circuit is also impressed on the grids of the electric discharge devices in order to maintain the voltage of the load circuit constant. In order to prevent the electric discharge devices from being subjected to excessive currents in the event that the excitation circuit is de-energized, I provide relay means to connect a resistance in series with the electric discharge device and to impress a negative potential on the grids of the electric discharge devices.

For a better understanding of my invention, reference may be had to the following description taken in connection with the accompanying drawing and its scope will be pointed out in the appended claims. The single figure of the drawing illustrates diagrammatically a preferred embodiment of my invention; and, Referring now to the drawing, there is illustrated an arrangement for transmitting energy from a direct current supply circuit 1 to an alternating current load circuit 2. This arrangement comprises a transformer 3 having a winding 4 connected to load circuit 2 and a winding 5 provided with an electrical midpoint 6 connected to one side of supply circuit 1 and with ends connected to the other side of supply circuit 1 through electric discharge devices 7 and 8. Each of the electric discharge devices 7 and 8 comprises an anode 9, a cathode 10 and a control grid 11. Electric discharge devices 7 and 8 are preferably of the vacuum type in which the conductivity of the device varies in accordance with the value of the potential impressed on its control grid 11. Cathodes 10 are connected to one side of supply circuit 1 through a resistance 12.

In order to render electric discharge devices alternately and successively conductive, the control grids 11 are connected to opposite ends of secondary winding 13 of transformer 14 whose primary winding 15 is connected to a source 16 of alternating current of the desired frequency. A resistance 18 is connected in series with resistance 12 between electrical midpoint 17 and cathodes 10. Resistance 18 is also connected in series with relay contact 19 between electrical midpoint 17 and cathodes 10 when relay contact 19 is in its actuated position.

I provide means for impressing a negative bias potential on control grids 11 which comprises a secondary winding 20 on transformer 3, and a rectifying means, such as electric discharge means 21. Electric discharge means 21 comprises a pair of cathodes 22 connected to opposite sides of winding 20 and a pair of anodes 23 connected to electrical midpoint 17 through a variable resistance 24. The electrical midpoint 25 of winding 20 is connected to cathodes 10 through ground and relay contact 19 when it is in actuated position. Capacitors 25 and 26 are provided to filter the direct current transmitted by electric discharge means 21. Relay contact 19 is moved to actuated position by relay winding 27 when an alternating current is induced in secondary winding 28. When in actuated position, relay contact 19 shunts resistance 12.

Assuming now that the switches 29 and 30 are in closed position and that energy is being transmitted from direct current supply circuit 1 to alternating current load circuit 2, an alternating current is induced in secondary winding 28 which energizes actuating winding 27 and moves contact 19 to closed position. An alternating voltage is also induced in secondary winding 20 which varies directly as the voltage of load circuit 2, since windings 4 and 20 are on the same transformer 3. The alternating voltage induced in winding 20 is rectified by electric discharge means 21 which impresses a negative potential on control grids 11 which varies in accordance with the voltage of load circuit 2.

If the voltage of load circuit 2 must be of sinusoidal form, the negative potential impressed on control grids 11 by electric discharge means 21 when the voltage of load circuit 2 is normal would permit both electric discharge devices 7 and 8 simultaneously to conduct a certain amount of current if no other potentials were impressed on control grids 11. Since switch 29 is closed, an alternating voltage is induced in secondary winding 13 which impresses alternating potentials on control grids 11 to render electric valves 7 and 8 alternately and successively conductive. During the initial portion of the half cycle of the alternating current of source 16 in which a positive potential is impressed on control grid 11 of discharge device 7, the positive potential decreases the negative potential on control grid 11 of device 7. At the same time, a negative potential is impressed on control grid 11 of device 8 which increases the negative potential on control grid 11 of device 8. Device 7 is therefore gradually rendered more conductive and simultaneously device 8 is gradually rendered less conductive until it ceases to conduct. The conductivity of device 7 increases as the positive potential induced in winding 13 increases and will decrease as the positive potential decreases. Near the end of this half cycle, the negative potential impressed on control grid 11 of device 8 by the potential induced in winding 13 by the voltage of source 16 decreases until device 8 is again rendered conductive. During the succeeding half cycle of the alternating current of source 16, device 8 is gradually rendered more conductive and device 7 is gradually rendered less conductive until it ceases to conduct. During the half cycle in which electric discharge device 7 is conductive current flows from one side of supply circuit 1 through the upper portion of winding 5, device 7 and relay contact 19 to the other side of supply circuit 1 and induces a half cycle of current of one polarity in winding 4. During the succeeding half cycle in which electric discharge device 8 is conductive current flows from one side of supply circuit 1 through the lower portion of winding 5, device 8 and relay contact 19 to the other side of supply circuit 1 and induces a half cycle of current of the opposite polarity in winding 4. In this manner, load circuit 1 is energized with alternating current. It will be noted that during the initial and last portions of each half cycle, both devices 7 and 8 will be conductive and current will flow in both the upper and lower portions of winding 5. During any one half cycle, however, more current will flow in either the upper or lower portion of winding 4 since the conductivities of electric discharge devices 7 and 8 will not be equal during any portion of a half cycle due to the potential impressed on control grids 11 by the alternating voltage of source 16.

Since the voltage of alternating current source 16 is constant, the average conductivities of devices 7 and 8, and therefore the voltage of load circuit 2, will depend on the negative potential impressed on control grids 11 by electric discharge means 21. This negative potential varies in accordance with the voltage of load circuit 2 and, therefore, if the voltage of load circuit 2 tends to rise above its normal predetermined value, a more negative potential is impressed on control grids 11 and the conductivities of devices 7 and 8 are decreased lowering the voltage of load circuit 2. If the voltage of load circuit 2 tends to decrease, a less negative potential is impressed on control grids 11 and the voltage of load circuit 2 is raised to its normal predetermined value. The normal voltage to be maintained in load circuit 2 can be set by adjusting the variable resistance 24 to determine the value of the negative potential impressed on control grid 11 when the voltage of load circuit 2 is at the normal value.

It will be noted that should switch 29 be opened while switch 30 remained closed, devices 7 and 8 would be rendered conductive and current would flow simultaneously in both the upper and lower portions of winding 5. No alternating voltage would be induced in windings 4, 20 and 28. Electric discharge means 21 would no longer impress a negative potential on control grids 11 and excessive currents would be transmitted by electric discharge devices 7 and 8. Relay contact 19, however, is opened when winding 27 is de-energized and the anode-cathode circuits of devices 7 and 8 are connected across supply circuit 1 through winding 5 and resistance 12. The potential drop across resistance 12 is therefore impressed on control grids 11 and decreases the conductivities of devices 7 and 8 as long as relay contact 19 is in open position. Relay contact 19 and resistance 12 are employed as protective devices to protect devices 7 and 8 and transformer 3 in the event of failure of the source 16 to deliver an alternating potential to control grids 11.

If the wave form of the alternating current of load 2 does not have to be of sine wave form, resistance 24 may be adjusted so that the negative potential impressed on control grids 11 is just sufficient to maintain electric discharge devices 7 and 8 nonconductive under normal conditions if the effect of the alternating potentials impressed on control grids 11 by the alternating current of source 16 is disregarded. Under normal conditions, therefore, the alternating voltage will be of substantially sine wave form. This will also be true if the voltage of load circuit 2 tends to fall below the predetermined value because the negative potential impressed on control grids 11 by electric discharge means will become less negative. Should the voltage of load circuit 1 tend to increase, however, the potential impressed on control grids 11 will become more negative so that the electric discharge devices will be nonconductive during the initial and final portions of the half cycles of the alternating current of source 16. The voltage induced in winding 4 will therefore not be of sine wave form unless a wave shaping circuit is added to the apparatus.

While I have illustrated and described a preferred embodiment of my invention, it will be apparent that changes and modifications can be made without departing from my invention, and I, therefore, aim in the appended claims to cover all changes and modifications as fall within the true spirit and scope of my invention.

What I claim as new and desire to secure by Letters Patent of the United States is:

1. In combination; a direct current supply circuit; an inductive winding and a plurality of electric discharge devices of the high vacuum type connected thereto, said electric discharge devices each being provided with a control member; a load circuit including a secondary inductive winding coupled to said first winding; rectifying means operatively associated with said load circuit for impressing a negative bias potential on said control members which varies in accordance with the voltage of said load circuit to vary the degree of conductivity of said electric discharge devices; and means for impressing alternating potentials on said control members to render said electric discharge devices alternately conductive.

2. In combination: a direct current supply circuit; an inductive winding and a plurality of electric discharge devices connected thereto, said electric discharge devices each being provided with a control member; a load circuit including a secondary inductive winding coupled to said first winding; means operatively associated with said load circuit for impressing a negative potential on said control members which varies in accordance with the voltage of said load circuit; an alternating current supply circuit for impressing alternating potentials upon said control members to render said electric discharge devices alternately conductive; and means operatively associated with said load circuit and responsive to the de-energization of said load circuit for impressing a negative potential on said control members to restrict the conductivity of said electric discharge devices.

3. In an electric translating apparatus for transmitting energy from a direct current supply circuit to an alternating current load circuit: a plurality of electric discharge devices connected between said direct current supply circuit and said alternating current load circuit; control means for said electric discharge devices for supplying an alternating potential to render said electric discharge devices alternately and periodically conductive; control means supplying a negative potential for varying the conductivity of said electric discharge devices in accordance with the voltage of said load circuit to maintain the voltage of said load circuit substantially constant; and means operatively associated with said load circuit and responsive to the de-energization of said load circuit for decreasing the conductivity of said electric discharge devices.

4 In an electric translating apparatus for transmitting energy from a direct current supply circuit to an alternating current load circuit: a plurality of electric discharge devices connected between said direct current supply circuit and said alternating load circuit, said electric discharge devices each being provided with a control member; control means for said electric discharge devices for supplying an alternating potential to said control members to render said electric discharge devices alternately and periodically conductive; control means operatively associated with said load circuit for impressing on said control members negative potentials which vary in accordance with the voltage of said load circuit; and means operatively associated with said load circuit and responsive to the de-energization of said load circuit for impressing a potential on said control members to decrease the conductivity of said electric discharge devices.

5. An electric translating apparatus for transmitting energy from a direct current supply circuit to an alternating current load circuit: a pair of electric discharge devices connected between said supply circuit and said load circuit, said electric discharge devices each being provided with a control member; control means for supplying an alternating potential to said control members to render said electric discharge devices alternately and periodically conductive; control means operatively associated with said load circuit for impressing on said control members negative potentials which vary in accordance with the voltage of said load circuit; and means operatively associated with said load circuit and responsive to the deenergization of said load circuit for impressing a potential on said control members to decrease the conductivity of said electric discharge devices.

References Cited in the file of this patent

UNITED STATES PATENTS 2,547,162   Kidd ------------------ Apr. 3, 1951

OTHER REFERENCES

Perpetual Trouble Shooters Manual, John F. Rider, vol. XVIII. Page "Farnsworth 18–39."

Radio Engineering, Terman, McGraw-Hill Book Co., New York, 1947.